United States Patent [19]

Kinoshita

[11] Patent Number: 4,553,167

[45] Date of Patent: Nov. 12, 1985

[54] IMAGE SIGNAL PROCESSING DEVICE

[75] Inventor: Takao Kinoshita, Tokyo, Japan

[73] Assignee: Canon Kabushiki Kaisha, Tokyo, Japan

[21] Appl. No.: 406,060

[22] Filed: Aug. 6, 1982

[30] Foreign Application Priority Data

| Aug. 8, 1981 | [JP] | Japan | 56-124215 |
| Aug. 8, 1981 | [JP] | Japan | 56-124216 |
| Aug. 21, 1981 | [JP] | Japan | 56-131085 |
| Sep. 4, 1981 | [JP] | Japan | 56-140014 |
| Sep. 8, 1981 | [JP] | Japan | 56-141535 |
| Sep. 9, 1981 | [JP] | Japan | 56-142818 |
| Sep. 10, 1981 | [JP] | Japan | 56-142641 |
| Sep. 12, 1981 | [JP] | Japan | 56-144270 |

[51] Int. Cl.$^4$ .............................................. H04N 5/78
[52] U.S. Cl. ...................................... 358/213; 358/212
[58] Field of Search ...................... 358/213, 167, 212; 357/24 LR, 30

[56] References Cited

U.S. PATENT DOCUMENTS

| 3,856,989 | 12/1974 | Weimer | 358/167 |
| 4,263,623 | 4/1981 | Woo et al. | 360/10 |
| 4,430,673 | 2/1984 | Salomon et al. | 358/213 |

Primary Examiner—Gene Z. Rubinson
Assistant Examiner—Robert Lev
Attorney, Agent, or Firm—Toren, McGeady, Stanger, Goldberg & Kiel

[57] ABSTRACT

In the disclosed image signal processing device, an area type CCD with an input shift register and an output shift register, is used as a band converting element or, by recycling the output of an output register to an input register, is used as a reproducing device for a still picture, by carrying out an analog to digital conversion in the process of the recycling, the S/N of the signal is increased.

6 Claims 16 Drawing Figures

FIG.1
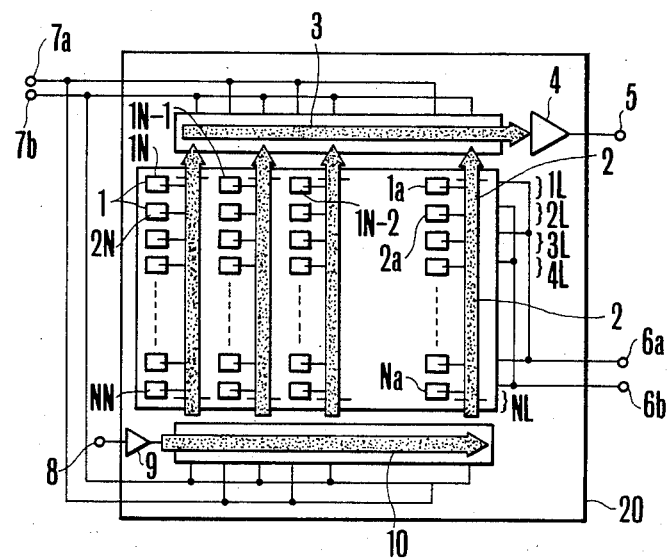
FIG.2
(a)
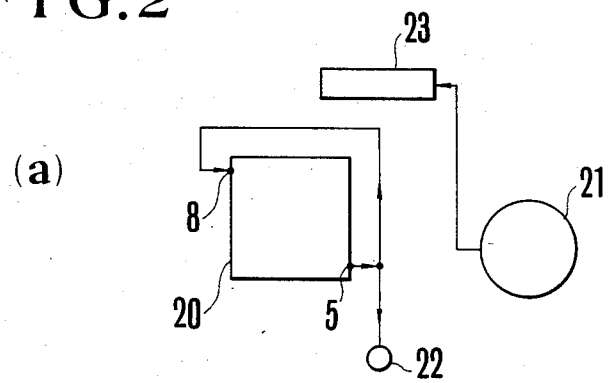
(b)
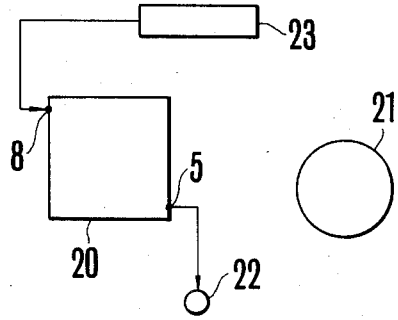

FIG.6
(a)
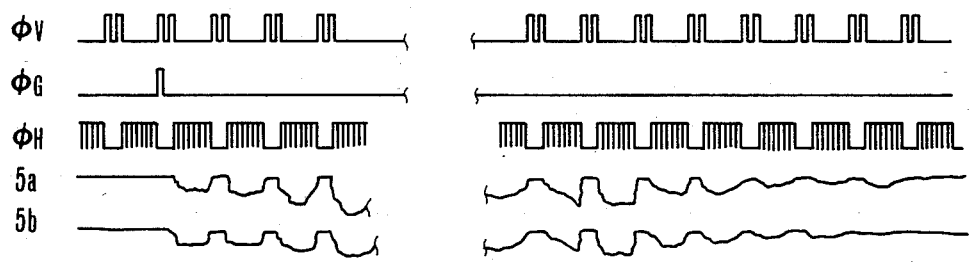
(b)
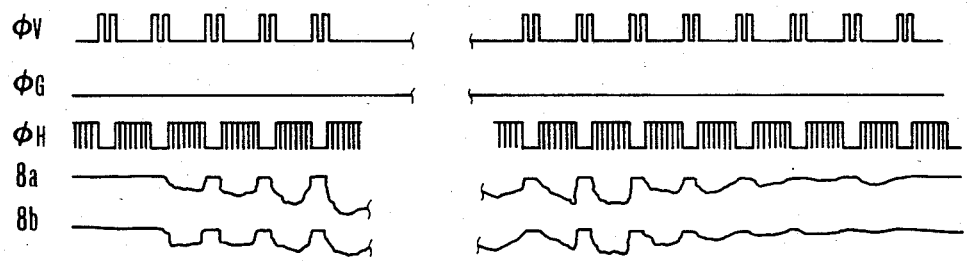
(c)
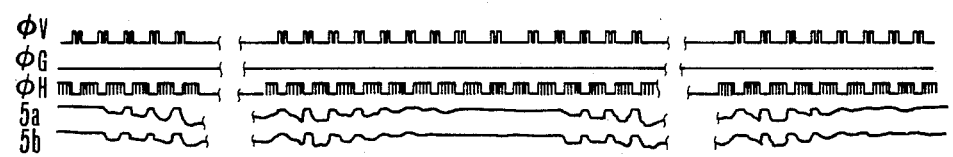

FIG. 8
(A)
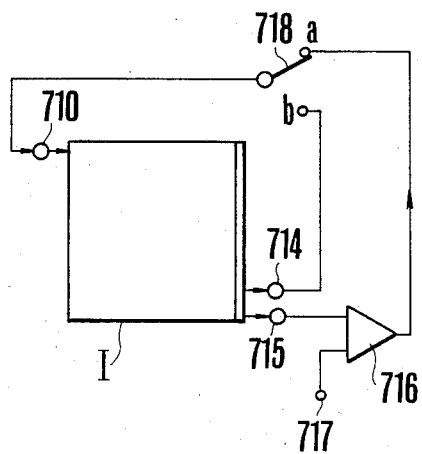
(B)
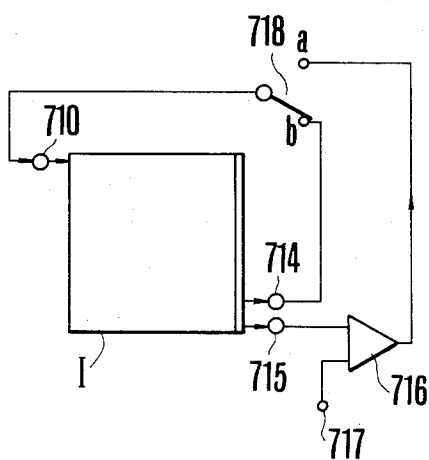

FIG.9
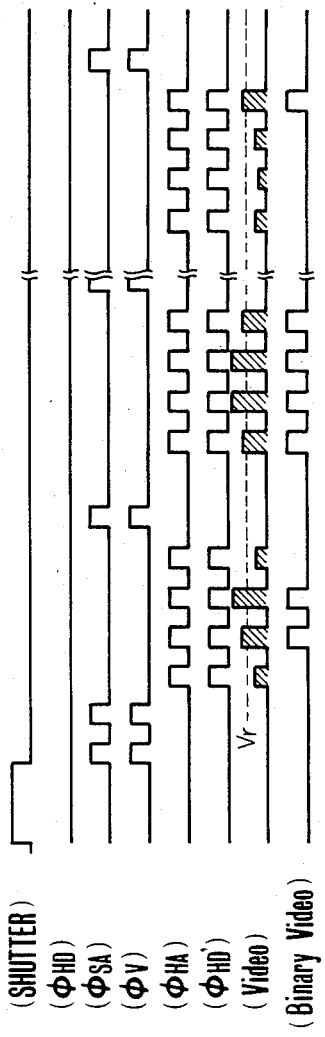
(A)
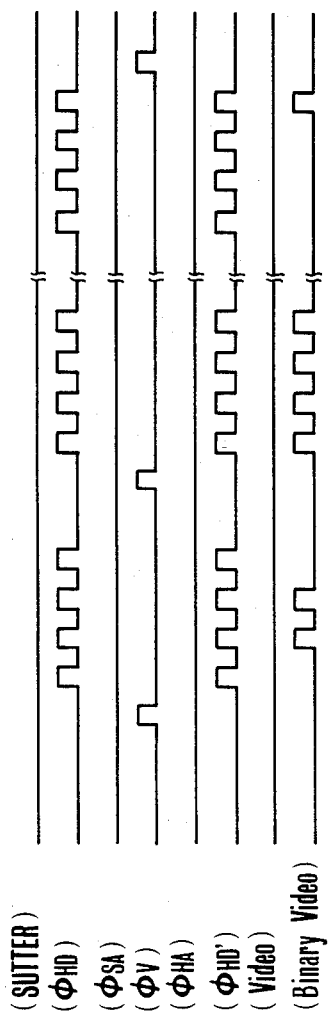
(B)

FIG.13
(A)
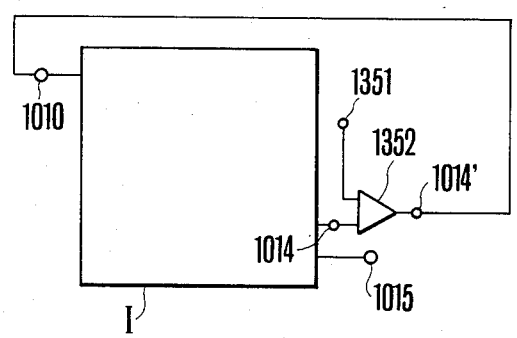
(B)
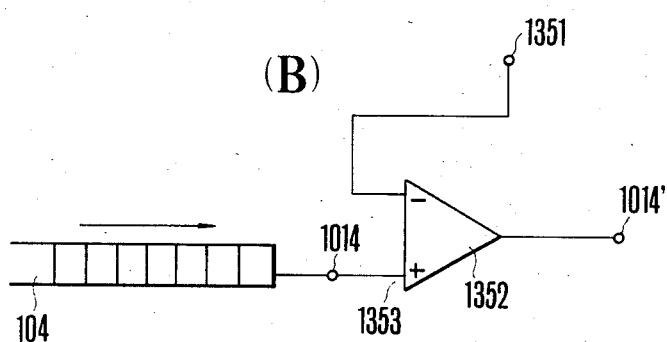
FIG.15
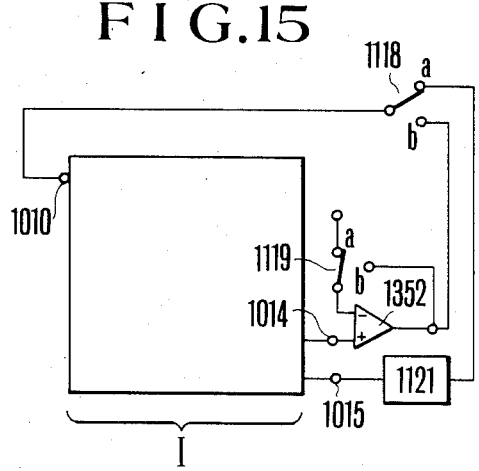

IMAGE SIGNAL PROCESSING DEVICE

BACKGROUND OF THE INVENTION

1. FIELD OF THE INVENTION

The present invention relates to an image signal processing device having a solid state image pick-up element such as a CCD (charge coupled device), particularly for reproducing a still picture.

2. DESCRIPTION OF THE PRIOR ART

In this kind of image signal processing device, the image is formed on and stored in the solid image pick-up element as a photoelectric charge and the photoelectric charge stored in the solid image pick-up element is read and recorded in a recording device, such as a magnetic tape or a magnetic disc in the recording mode, the image signal stored in the recording device is transferred to a monitor such as TV in the reproduction mode. However, in such a conventional device, the magnetic tape or the magnetic disc is used as the recording device, and it is necessary to choose a relatively low speed for recording the signal in the recording device or for reading the signal from the recording device.

On the other hand, a high speed image signal is needed for a monitor such as a TV. Consequently, in a conventional device uses a memory device in the recording mode, the photoelectric charge for one picture from the solid image pick-up element is transferred to the memory device and the signal transferred to the memory device is delivered to the recording device at a low speed. In the reproducing mode the signal for one picture is read from the recording device at a low speed, stored in the memory device, and the signal for one picture stored in the memory device is delivered to the monitor at a high speed.

However, this has required a memory device of large capacity, because the signal for one picture has to be stored, while it is difficult to reproduce a still picture which is stable for a long time.

This is, where a still picture is continuously reproduced, the signal stored in the memory is repeatedly read at high speed and delivered to a monitor such as a TV. On the other hand, where the signal is continuously read with the memory device, the increase of dark current or imperfect transfer efficiency makes it impossible to obtain a stabilized picture unless the content of the memory device is refreshed a predetermined intervals. Thus, it becomes necessary to transfer the image signal for one picture from the recording device to the memory at intervals. This creates the danger of distributing the whole picture with the refresher operation.

Further, even if the information of the picked up image for one field is repeatedly reproduced via the memory, the image resolving power is lowered, because the TV monitor scans two fields in one frame. Further, where the image continuously picked up for two fields is repeatedly reproduced, the picture is disturbed for every one field and the quality of the picture is degraded.

SUMMARY OF THE INVENTION

It is an object of the present invention to overcome the above-mentioned shortcomings by providing an image signal processing device free from the above shortcomings.

It is another object of the present invention to provide an image signal process device and a semi-conductor device which can convert the signal band width.

It is further another object of the present invention to provide an image signal processing device and a semi-conductor device for reading the once obtained image information by interlacing.

It is further another object of the present invention to provide an image signal processing device and a semi-conductor device for repeatedly reading the image for one picture without degrading the picture quality.

It is further another object of the present invention to provide an image signal processing device and a semi-conductor device which can change over the tone of the once recorded image information.

It is a further object of the present invention to provide an image signal processing device and a semi-conductor device with a high image resolving power.

In order to achieve the above-mentioned objects, in accordance with an embodiment of the present invention, the solid state image pick-up element's charge transfer part is used as a buffer memory and the signal of the charge transfer portion of the solid image pick-up element is repeatedly circulated so as to continuously read and deliver the image signal for one picture to the monitor in order to reproduce a still picture, while a memory for storing part of the image signal for one picture successively receives image signals of predetermined parts of one picture from a recording device that may produce image signals at low speed, and the content of the memory is transferred to the charge transfer part of the solid image pick-up element at high speed and a partial refreshing of the image signal is successively repeated so as to refresh the image signal for one picture.

In accordance to another embodiment of the present invention, an external input signal is entered into the charge transfer portions of the solid image pick-up element and the charge transfer portion of the solid image pick-up element is used as the buffer memory, while a drive signal for entering the external input signal in the charge transfer part of the solid image pick-up element is given a frequency different from that of a reading driving signal so that the high speed picture signal is converted into a low speed signal or the low speed picture signal is converted into a high speed signal in order to overcome the above shortcomings.

In accordance with a further embodiment of the present invention, the memory portion includes a charge transfer type semi-conductor device and a number of horizontal shift registers are capable of reading two adjacent lines in the memory portion, while the output of the one register is re-entered into the memory portion so that the information for one frame is converted into successive signals for two fields.

In accordance with another embodiment of the present invention, recycling the information in the memory portion involves again entering the information into the memory after analog-to-digital conversion. This eliminates noise due to the dark current and prevents diminution of transfer efficiency.

In accordance with further another embodiment of the present invention, each address of the area type CCD operating as memory is divided into a number of territories so that the information of each address can be read by the unit of the divided territories or by the unit of each address in such a manner that a memory can be used not only as the analog memory but also as a digital memory.

As mentioned above, in the solid image signal converting device of the present invention, the charge signal transfer path for one picture element of the solid image pick-up element is divided into a number of paths so as to divide the light signal for one picture element into a number of signals and delivers the divided signals to the solid image pick-up element as independent signal which are respectively converted into binary signal when converting the picked up image into binary signals, the resolving power of the picked up image can be raised. This is quite effective for converting the signal of the image picked up by the solid image pick-up element into binary signals.

BRIEF DESCRIPTION OF THE DRAWINGS

FIG. 1 shows an embodiment of the solid element suited for the image signal processing device of the present invention.

FIG. 2(a) is a block diagram of an embodiment of the image signal processing device of the present invention operating in a reproducing mode, and FIG. 2(b) shows the same device operating in a refreshing mode.

FIGS. 6(a), 6(b) and 6(c) are wave forms for showing timing.

FIGS. 8(A) and 8(B) are block diagrams of a fourth embodiment of the image signal processing device for recording and reproducing the image with the solid element in FIG. 7.

FIGS. 9(A) and 9(B) show wave forms for explaining the operation of FIGS. 8(A) and 8(B).

FIGS. 13(A) and 13(B) are block diagrams of a sixth embodiment of the image information processing device for driving and controlling the solid element in FIG. 10 in a second mode.

FIG. 15 is a block diagram of a seventh embodiment of the image information of processing device for driving and controlling the solid element in FIG. 10.

DESCRIPTION OF PREFERRED EMBODIMENTS

Figure 3:
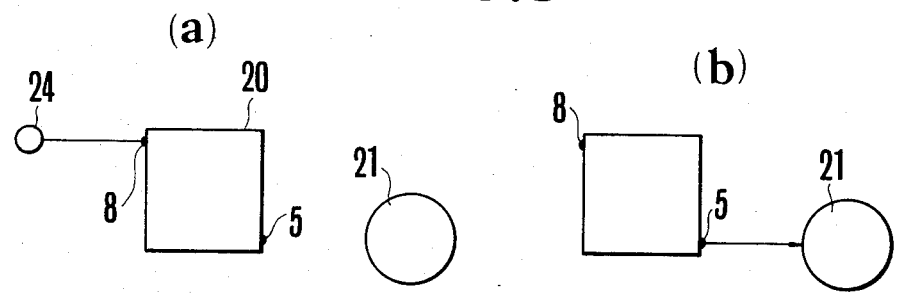
FIGS. 3(a) and 3(b) are block diagrams of a second embodiment of the image signal processing device of the present invention, with FIG. 3(a) showing an input mode, while FIG. 3(b) showing a recording mode.

The image signal processing device of the present invention is explained in connection with the accompanying drawings.

FIG. 1 shows an embodiment of a solid element 20 suited for the image signal processing device of the present invention. The solid state element 20 includes picture elements 1 which form a light sensing arrangement. When the image is formed on the picture elements 1, the photoelectric charge corresponding to the image is stored in each picture element. Vertical transfer registers 2 form a memory. The photoelectric charge stored on the picture elements 1 is transferred to the registers 2 by means of gate pulses φG (not shown). A horizontal transfer register 3.

The register 10 has a capacity for the above one line.

FIGS. 2(a) and 2(b) are block diagrams of an embodiment of the image recording device system of the present invention. FIG. 2(a) shows the system is the reproducing mode, while FIG. 2 shows the system in the refresh mode.

FIGS. 2(a) and 2(b) shows the solid state element of FIG. 1 with the external input terminal 8 and the output terminals. A recording device 21 may for example use magnetic tape or a magnetic disc, and an output terminal 22 delivers the image signal to an external monitor such as a television set. An analog shift register 23 records, for example, one line of the area sensor, namely, one line in FIG. 1.

Below, the present invention is explained in connection with FIGS. 1 to 2(b). As a first example, the image signal formed on the solid state element 20 is stored in the recording device in advance, while the terminals 5 and 8 of the solid element 20 are connected as is shown in FIG. 2(a).

In this state, the terminals 5 and 8 are connected. Hence, the image signal is circulating in the shift registers of the solid state element 20. Consequently, by making the frequency of the driving pulses that of the monitor band, the image signal for one picture is produced repeatedly at the terminal 22 in such a manner that in the monitor device displays one still picture continuously.

On the other hand, the image signal of a part of the picture, namely, for one line is stored in the register 23 from the recording device 21. In this case, the read out of the recording device 21 (magnetic recording means) is carried out at a frequency suited for the recording device. For example, a frequency of the audio band is used.

Now let us suppose that the image signal for the line 1L is transferred from the recording device 21 to the register 23. Then, as shown in FIG. 2(b), the register 23 is connected to the input terminal 8 of the solid element 20 in synchronism with the transfer of the image signal for the line 1L to the register 3. In this way, the image signal for the new line 1L is transferred to the register 10 in synchronism with the read out of the line 1L. When the signal for the line 1L has been transferred to the register 10, the terminals 5 and 8 are again connected as shown in FIG. 2(a). In this way, the image signal for the line LL is refreshed in a manner such that the image signal is again circulated and the still picture is produced continuously.

After the image signal for the line 1L has been refreshed in this way, the image signal for the line 2L is transferred slowly to the register 23 from the recording device with the above frequency in the audio band. Then in synchronism with the transfer of the image signal for the line 2L to the register 3 the register 23 is connected to the terminal 8 as is shown in FIG. 2(b). Thus, as mentioned, this refreshes the image signal for the line 2L. Then, with the above-mentioned operation, the image signals are successively shifted from the line 1L to line NL such that the image signal for the whole picture is refreshed.

Further, where the image signal of the register 23 is transferred to the register 10 of the solid state element 20, the driving frequency and the driving phase of the register 23 are same as or in synchronism with the drive pulses of the solid state element.

As explained above, in the case of the image signal processing device of the present invention, the charge shift register 2 and 3 of the solid state element 20 are used as buffer memories. Hence, the image signal of the solid state element 20 is circulated in the charge shift register 2, while a part of the image signal from the recording device is successively transferred to the memory 23, the content of which memory is entered in the charge shift registers 2, 3 and 10 of the solid state element 20 at predetermined intervals so as to refresh the image signal successively. Thus, without using a memory device of a large capacity and without disturbing the whole reproduced picture the refreshing and the picture change can be carried out.

Although in the case of the present embodiment, the light is sensed with the solid state element 20, the element can be used simply as the memory.

FIGS. 3(a) and 3(b) are block diagrams of a second embodiment of the image signal processing device of the present invention. FIG. 3(a) shows the input mode of the external image signal, while FIG. 3(b) shows the recording mode to the recording device.

In the drawing, 24 is an external device for delivering the image signal to the external input terminal.

Now, let us suppose that the external device 24 applies an image signal of high frequency such as a TV signal to the terminal 8. By making the above drive pulses of the solid state element 20 a high frequency synchronized with the above frequency, the external image signal is successively stored in the register 2 via the register 10. Namely, the external image signal is successively transferred to the register 10 as the charge via the voltage-charge converter 9. When the transfer to the register 10 has been finished the charge of the register 10 is transferred to the register 2 and the external image signal is gain applied to the register 10 successively. After the repetition of tne above operation, the external image is stored in the register 3 as the memory.

After that, the output terminal 5 of the solid state element 20 is connected to the recording device 21 so as to read out the solid element in such a manner that the image signal stored in the register 2 is recorded in the recording device 21. In this case by making the frequency of the drive pulses of the solid element one with which the recording device can carry out recording, i.e. low, the image signal can be recorded slowly.

In normal image recording, an image forming on the solid state element 20 via photographic optics such as lenses to let the image be stored on the picture elements 1a-NN as a photoelectric charge. This charge is read out with the driving pulses and the image signal is recorded on the recording device 21 so as to carry out a normal image pick-up.

As explained above, in the case of the image signal processing device of the present invention, the charge transfer part (shift registers) of the solid image pick-up element such as a CCD is used as a buffer memory, and the frequency of the driving pulses for entering the signal in the charge transfer part is made different from that of the read out drive pulses. This is done to change the speed of the image signal, namely, the frequency band, and in such a manner that without using the buffer memory or the special band converter the frequency band can be changed. The technique is quite effective, for example, for use with an image recording device.

Figure 4:
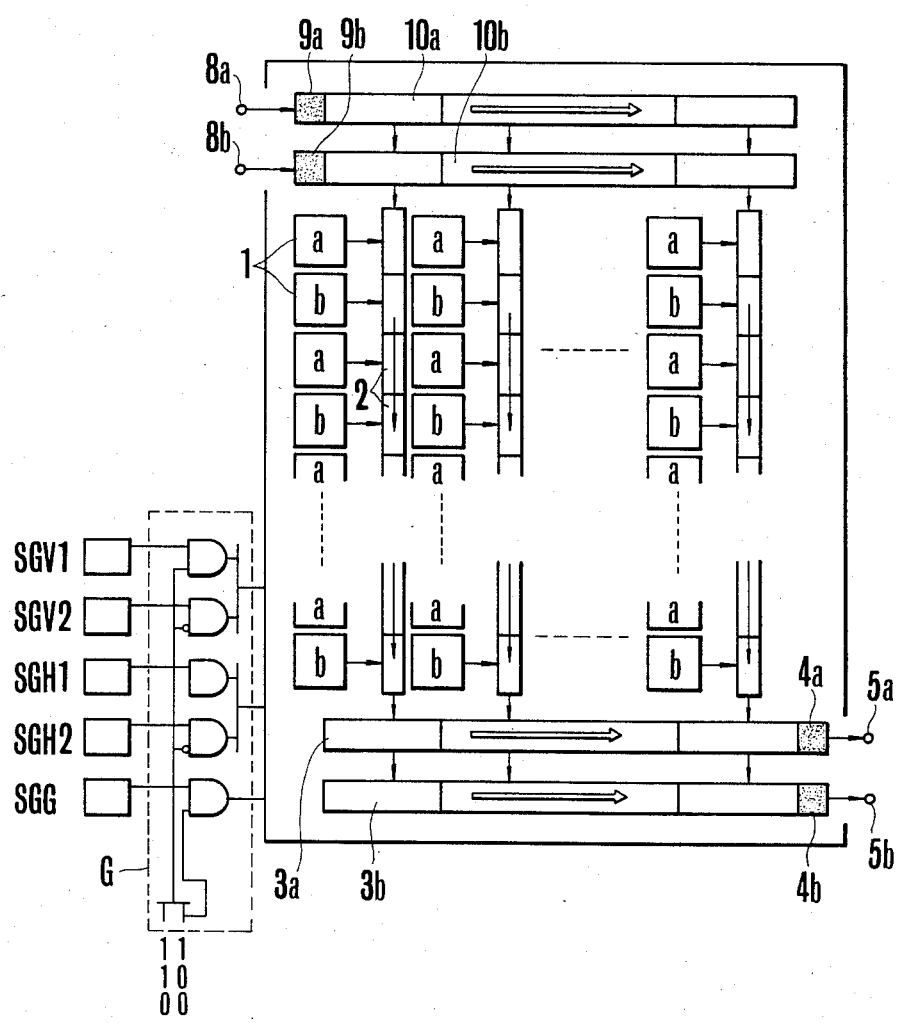
FIG. 4 shows the block diagram of a second embodiment of the semi-conductor device suited for the image signal processing device of the present invention.

FIG. 4 shows the block diagram of a second embodiment of the present invention. Although in the drawing an interline type CCD image sensor whose light sensing part is different from the transfer part is shown, a frame transfer type or other type image sensor as well as a combination of a number of line sensors can also be used. In FIG. 4, light sensing parts 1 form picture elements. Such lighting sensing parts 1 are arranged in the form of a matrix as is shown. A CCD (charge coupled device) CCD2 serving as a memory has one line of CCds arranged so as to correspond to the light sensing parts 1 arranged vertically in one line. The photoelectric charge is applied from the light sensing part 1 by the drive pulses $\phi G$ to be explained later and the charge in the CCD2 is shifted vertically by the pulses $\phi V$. The charge shifted vertically by the pulses $\phi 1$ in the CCD2 is successively shifted to the horizontal transfer devices CCD3a and CCD3b. The image signal of the line of even number is delivered to the devices CCD3a, while that of the line of odd number is delivered to the devices CCD3b. The charge in the horizontal transfer devices CCD3a and CCD3b is shifted by the pulses $\phi H$ to the horizontal transfer CCD3a and CCD3b and delivered from the terminals 5a and 5b via the charge-voltage converters 4a and 4b.

External input terminals 8a and 8b receive with the image signal because the device CCD2 is used as the buffer. For example, the signal of the even number line is applied to the terminal 8a, while that of the odd number lined is applied to the terminal 8b.

Voltage-charge converters 9a and 9b convert the voltage signals into charge signals.

Horizontal transfer CCDs 10a and 10b shift the charge applied in series with the pulses $\phi H$ and deliver the charges in parallel with the pulses $\phi V$. The horizontal CCD 10b is connected to the device CCD2 so as to store the external signals in the device CCD2.

Signal generators SGV1 and SGV2 produce the vertical pulses $\phi V$. Thereafter, SGV1 produces its pulses in synchronism with the recording device, while the generator SGV2 produces its pulses in synchronism with the TV device.

Signal generators SGH1 and SGH2 produce pulses $\phi H$. The generator SGH1 produces its pulses in synchronism with the recording device, while the generator SGH2 produces its pulses in synchronism with the TV device.

A signal generator SGG serves for producing pulses $\phi G$. A gate circuit G gates the above signal generators with mode change over signals.

For example, in photographing a picture, the signal 11 is applied, in reproduction preparation (transfer to the CCD) the signal 10 and in the case of the reproduction (transfer to TV) the signal 00.

Figure 5:
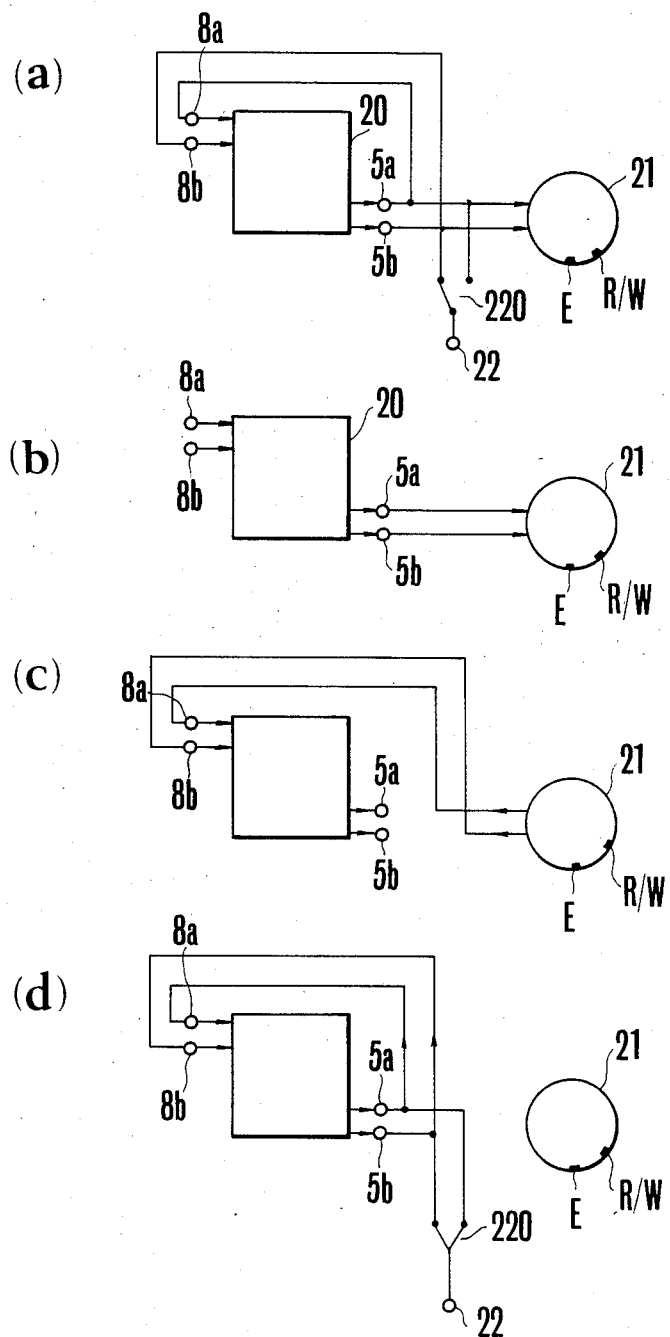
FIGS. 5(a), 5(b), 5(c) and 5(d) show a third embodiment of the image signal processing device.

FIGS. 5(a), 5(b), 5(c) and (5d) show block diagrams of an embodiment of the image processing device using the solid state element in FIG. 4. In the drawing, the solid state element 20 operates with a recording device 21 such as magnetic tape or a magnetic disc, having an enable terminal E and a read/write terminal R/W. When a signal is applied to the terminal E it becomes possible to read or write the content of the device. To the terminal R/W receives delivery of the read or write signal. Normally, the read signal is delivered. A switch 220 is switched over with a signal not shown. In this case the switch is switched over every 1/60 sec. A terminal 22 delivers the interlace signal to the TV device.

The operation of the present embodiment will be explained in connection with FIGS. 4 and 5(a), 5(b), 5(c) and 5(d).

Normal image recording is explained in connection with FIG. 5(b). The image is formed on the solid state element 20 via a photographic optics such as lenses, the image is stored on the light sensing elements of the picture portion as a photoelectric charge, the photoelectric charge is read with the pulses $\phi G$, $\phi H$ and $\phi V$, the enable signal is applied to the terminal E and the write instruction signal is applied to the terminal R/W, so the image signal is recorded in the recording device 21. The timing of the pulses $\phi G$, $\phi B$ and $\phi H$ is as shown in FIG. 6(a), so the gate circuit G is controlled such that the outputs of the signal generators SGV, SGV1 and SGH1 are applied to the solid element so as to synchronize the drive with the recording timing of the recording device 21. Hereby as is shown with the wave forms 5a and 5b in FIG. 6 the signals of the odd number line and those of the even number line are registered in parallel.

The image signal in the recording device 21 being transferred to the solid state element 20 is shown in FIG. 5(c).

When a signal is applied to the enable terminal E of the recording device 21 and the read instruction signal is applied to the terminal R/W, the image signal in the recording device 21 is read and delivered to the terminals 8a and 8b. The signal to be delivered is delivered to the CCD2 with the pulses $\phi V$ and $\phi H$ via the CCD 10a and the CCD 10b as is shown in FIG. 6(b). The timing of the pulses $\phi V$ and $\phi H$ as is previously explained.

The image signal in the solid element 20 being displayed with a display device such as a TV is shown in FIG. 5(d).

As is shown in FIG. 5(d), the content of the solid state element 20 is circulated and the switch 220 is switched over with the timing signal (not shown) of 1/60 sec.

When the terminal 5b is now connected, the image signal of the odd number line or that of the even number line of the image signal in the solid state image pick-up element 20 is fed out. When the terminal 5a is connected with the timing signal (not shown), the remaining image signal is fed out.

Consequently, the image signal in the device CCD2 is led out in a way of interlace to be delivered to the TV device. The timing wave form is shown in FIG. 6(c). Of course, the timing is faster than those in FIG. 6(a) and FIG. 6(b), and the gate circuit G is controlled such that the signals of the signal generators SGV2 and SGH2 are applied to the solid image pick-up element 20.

Forming the image pick-up device as above permits avoiding a complicated construction for delivering the image signal to the TV device.

Although the above embodiment uses two devices like the CCD's CCD10a and the CCD10b, the number of the devices can be further increased. It goes without saying that the solid state element can be shaded as a whole.

Figure 7:
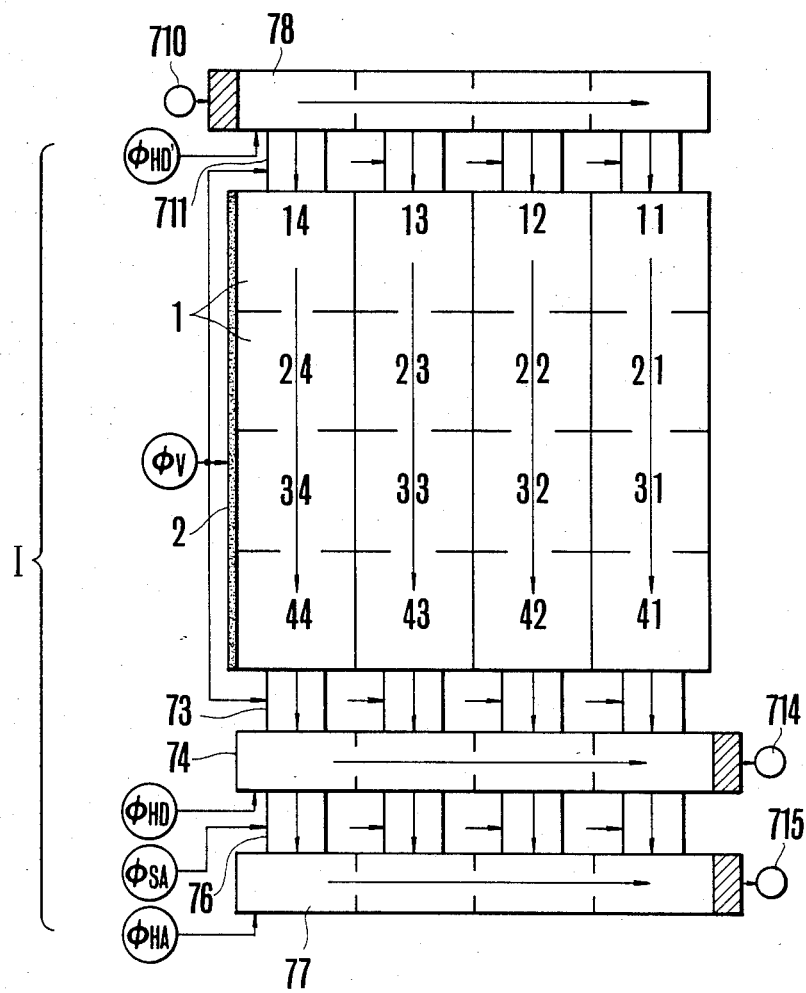
FIG. 7 illustrates a third embodiment of a solid element suited for the present invention.

FIG. 7 shows the third embodiment of the solid state element suited for the present invention. In order to simplify the explanation, the present embodiment is a CCD area type sensor having picture elements in four columns in four rows and a single phase driven shift register.

In the drawing, [11]–[44] are the picture elements forming the light sensing part. The picture elements [11]–[14] constitute the first line, the picture element [21]–[24] the second line, the picture elements [31]–[34] the third line and the picture elements [41]–[44] the fourth line.

The light sensing part acts as a vertical shift register when the stored charge is transferred, and at the same time acts as the transferred, and at the same time acts as the transferred portion.

A vertical shift register 2 transfers the charge stored in each picture element successively to the lower line every time the transfer pulse $\phi V$ is applied.

Horizontal shift registers 74 and 77 have a four bit construction. A gate 73 parallel inputs the charge signal stored in the fourth line to the register 74, and is opened and closed with the pulses $\phi V$. The signals transferred to the register 74 are serially transferred successively, along the direction of the arrow in synchronism with the horizontal transfer pulse $\phi HD$ and emitted serially from the output terminal 714.

A gate 76 between the registers 74 and 77 is opened and closed with the shift pulse $\phi SA$ so as to parallel transfer the signal of the register 74 to the register 77. The register 77 serially transfers the signals along the direction of the arrow in the drawing in synchronism with the horizontal transfer pulse $\phi HA$, and the signals are serially emitted from the output terminal 715.

A horizontal shift register 78 enters the signals an input terminal 710 receives the digital signal and the register 78 successively and serially transfers the input signal along the direction of the arrow in the drawing in synchronism with the transfer pulse $\phi HD'$. Gates 711 between the register 78 and the first line are opened and closed with the transfer pulse $\phi V$ so as to parallel transfer the content of the register 78 to the first line.

Image recording and reproduction with the solid state element is explained in connection with FIGS. 8(A), 8(B), 9(A), and 9(B).

In FIG. 8, a solid state image pick-up element I corresponds to that in FIG. 7 and and A/D converting 716 has one input terminal connected to the output terminal 715 of the register 77 and a standard voltage Vr applied to the other input terminal 717.

The case of the image being recorded as the digital value is explained in connection with FIGS. 8(A) and 9(A).

Suppose that the shutter in front of the solid image pick-up element is opened and the image is formed on the solid element via the image forming optics. In this way, the image charge signal is stored on each picture element so as to correspond to the image. Then the shutter is closed and as shown in FIG. 9(A) two transfer pulses $\phi SA$ and $\phi V$ are supplied. Thus, the gates 73 and 76 are opened, while the image charge signal stored in each line is shifted two lines downwards in the drawing such that the image signal stored in the picture elements [41]–[44] is transferred to the register 77 and that stored in the picture elements [34]–[31] to the register 74. After that, as shown in FIG. 9(A), four pulses of φHD', φHA serially transmits the content of the register 77 from the output terminal 715. Because the output terminal 715 is connected to the comparator 716 as mentioned above, the image signal stored in each picture element [41]–[44] and serially transmitted from the output terminal 715 is compared with the standard voltage Vr as shown in FIG. 9(A). Now, it is assumed that the level of the charge stored in the picture element [41], [44] is lower than Vr, while that of the charge stored in the picture element [42], [43] is higher. As is shown in FIG. 9(A), the charge stored in the picture element [41], [44] is converted into zeros while that stored in the picture element [42], [43] is converted into ones.

In the recording mode, the change over switch 718 is connected to the contact a and the binary signal from the comparator is serially transferred to the register 78 via the input terminal 710.

After the image of the picture element [41]–[44] is converted into a binary signal, the content of the register 74 is transferred to the register 77 with one of each of transfer pulses φV and φVA, while the signal of the charge stored on each line is transferred for one line downwards and the content of the register 78, namely, the binary signal of the charge stored on each picture element [41]–[44] is transferred to the first line. Thereafter, the four pulses φHD' and φHA transfer the content of the register, namely, the binary signal of the image stored on the picture element [31]–[34] to the register 78. The, one of each of pulses φSA and φV and four pulses φHD' record the binary signal of the charge stored in the picture element [21]–[24], [11]–[14] on each line part of the solid image pick-up element.

After the above, the binary signal of the image on each picture element is recorded on each line of the solid image pick-up element, the switch 718 is connected to the contact b as is shown in FIG. 8(B). Thus, the output terminal of the register 74 is connected to the input terminal of the register 78 and the binary signal of each picture element is applied in the register 78. Thus, by alternatively supplying the transfer pulses φV (one pulse) and φHD' (four pulses) as shown in FIG. 8(B) the binary signal corresponding to the charge stored on each picture element [11]–[41] is successively delivered from the output terminal 714.

Because the solid image pick-up element of the present invention converts the image signal into a binary signal, which can be circulated, using the transfer part of the solid state image pick-up element itself as the buffer memory, it is possible to transmit the image signal of one picture continuously for a long time without influence of the dark current or the transfer efficiency even when the transfer part of the solid image pick-up element is used as the buffer memory to circulate the image signal. Thus, by delivering the binary signal from the output terminal of the register 74 to the TV monitor, a sharp picture can be monitored continuously for a long time.

Although in the present embodiment, a CCD area sensor whose light sensing portion acts as a transfer section is used as the solid state image pick-up element, it goes without saying that an interline type, a frame transfer type and any other type of image sensor can be used.

Further, unifying the comparator and the solid state image pick-up element in the above embodiment results in an effective compact device.

As explained so far in detail, the solid state image pick-up element of the present invention, includes an input portion for receiving the binary signal and besides an output for transferring an analog image signal, an output for transferring the binary signal. Hence, merely connecting the comparator to the output for transferring the analog image signals makes it easily possible to obtain a binary signal from the image signal at the output portion, and feeding back the binary signal to the solid image pick-up element makes it possible to circulate the image signal in the form of a binary signal in the solid state image signal element in a manner such that the problem of dark current and transfer efficiency can be solved even when the image signal is circulated in the solid image pick-up element.

Figure 10:
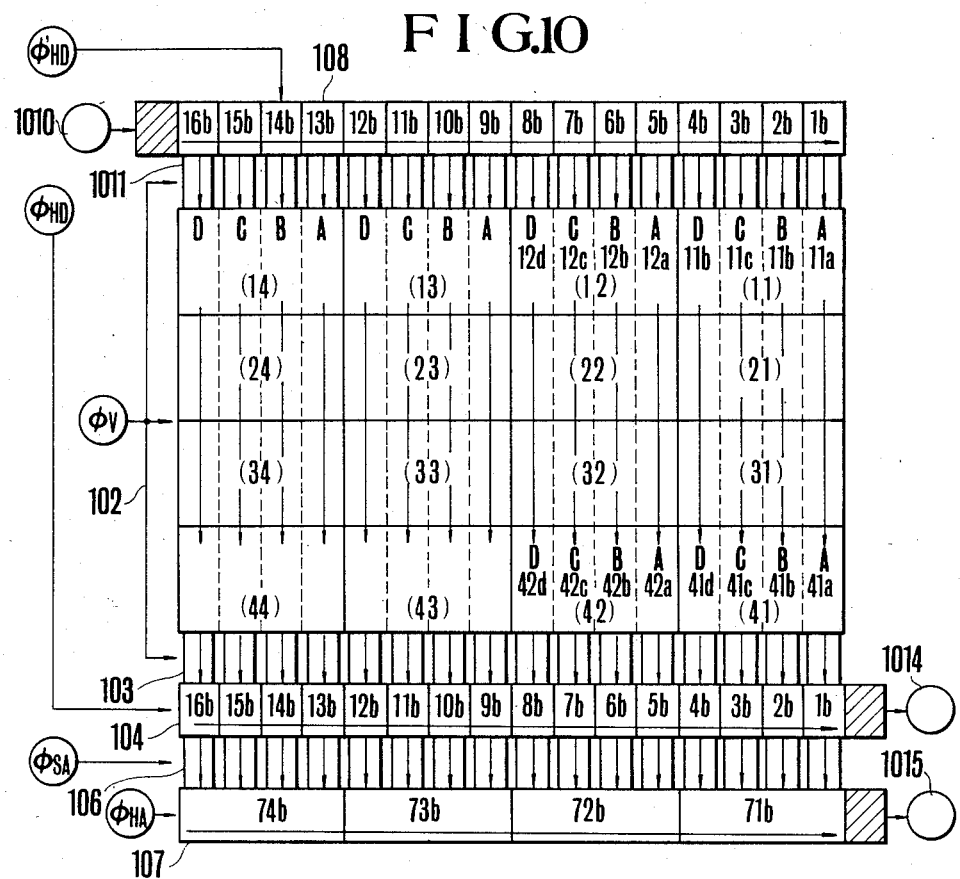
FIG. 10 shows a fourth embodiment of the solid element suited for the image signal processing device of the present invention.

FIG. 10 shows a fourth embodiment of the solid state element suited for the image signal processing device of the present invention. In order to simplify the explanation, in the present embodiment, a solid state image pick-up element of the CCD area type sensor having the picture elements in four columns four rows and consisting of one phase driven shift register is described.

In the drawing, [11]–[44] are the picture elements constituting a light sensing portion wherein the picture elements [11]–[14] form a first line, the picture elements [21]–[24] a second line, the picture elements [31]–[34] a third line and the picture elements [41]–[44] fourth line. As is shown in dotted lines in the drawing, each picture element is divided into a number of sections (four) with a channel stop or the like. Specifically, element [11], for example, is divided into four sections A–D. Other picture elements are divided into four sections in the same way. The light sensing portion of the solid state element acts as the vertical shift register for successively transferring the light signal incident on each picture element downwards in the picture during transfer of the stored charge, and at the same time acts as a transfer portion. The vertical shift register corresponding to each picture element is divided into a number of sections (four) so as to correspond to the number of section of the individual picture elements (four). For example in the case of the picture element [11] the vertical shift register portion corresponding to the territories A–D of the picture element [11] is divided into four sections 11a–11d such that the photoelectric charge stored in each territory of the one picture element is transferred independently by each register portion. Further, the vertical shift registers corresponding to other picture elements are also divided in four sections so as to correspond to each picture element territory. For example, the photoelectric charge stored in each territory of the picture element [11] is transferred downwards independently in the drawing with the divided register parts 11a–11d.

A vertical transfer electrode 102 receives the transfer pulse φV, and every time a pulse φV is applied to the electrode the charge is stored in each territory of each picture element is successively transferred downwards by the vertical shift register.

Horizontal shift register 104 has bits (1b–16b) of a number of corresponding to the products of the number of the columns of the picture elements (4) with the number of the territories (4) (4×4=16). Each bit of the register is applied with the light signal transferred from the shift register corresponding to each territory (A, B, C, D) of the picture elements [41]–[44] of the fourth line. That is, the light signal of the territory A–D of the picture element [41] is independently transferred to the bit 1b–4b of the register 104 via each register portion 41a–41d, while the light signal of each territory A–D of the picture element [42] is independently transferred to the bit 5b–8b via each register portion 42a–42d. Further, the light signal of each territory of other picture element [43], [44] is independently transferred to the bits 9b–12b and 13b–16b. The signal transferred to each bit of the register 104 is serially transferred successively along the direction of the arrow in synchronism with the horizontal transfer pulse φHD and from the output terminal 1014. In the present embodiment, the register 104 has 16 bits so that with 16 pulses φHD read the content of the register 104. A gate 103 parallel transfers each light signal from the shift register corresponding to each territory of the picture elements [41]–[44] of the fourth line to each bit, by being opened and closed with the pulse φV.

A horizontal shift register 107 has a content of four bits 71b–74b. The first bit 71b of the register is connected to the bits 1b–4b of the register 104, and each signal of the bits 1b–4b of the register 104 is applied to the first bit 71b of the register 107, while the signal independently applied to each bit 1b–4b of the register 104 forms the first bit 71b. In the same way, the second to the fourth bits 72b–74b of the register are connected to the bits 5b–8b, 9b–12b and 13b–16b. Thus, the content of the bits 5b–8b of the register 104 is entered in the second bit 12b, the content of the bit 9b–72b in the third bit 73b and the content of the bit 13b–16b in the fourth bit 74b so that the signal input in each bit 72b–74b is composed of several bits. The register 107 serially transfers the signal in each bit along the direction of the arrow in the drawing in synchronism with the horizontal shift pulse φHA, so the signal appears serially at the output terminal 1015. In the case of the present embodiment the register 107 has four bits so that four pulses φHA read the content of the register 107.

Gate 106 between the registers 104 and 107 and close in response to shift pulse φSA to parallel transfer the signal of the register 104 to 107.

A horizontal shift register 108 has an input terminal 1010 which receives a digital signal input. The register 108 has 16 bits 1b–16b and serially and successively transfers the signal input via the input terminal 1010 along the direction of the arrow in the drawing in synchronism with the transfer pulse φHD′. The register has 16 bits so that 16 transfer pulses φHD′ cause the input signal to be read.

Gates 1011 between the register 108 and the first line of the picture element of the solid image pick-up element, open and close in response to a pulse φV so as to parallel input the content of the register 108 in the vertical shift register of the first line. The bits 1b–4b of the register 108 are connected to the divided register portion 11a–11d such that the signal of the bit 1b is independently entered in the shift register portion 11a, that of bit 2b in portion 11b, that of bit 3b in portion 11c and that of bit 4b in portion 11d. In the same way the signals of the bits 5b–8b are independently entered in the divided shift register portions of the picture element [12], those of bits 9b–12b in the divided shift register of the picture element [13] and those of bits 13b–16b in the divided shift register of the picture element [14].

Image recording and reproduction with the solid state element in the first mode is explained in connection with Figs. 11(A) to 12(B).

Figure 11:
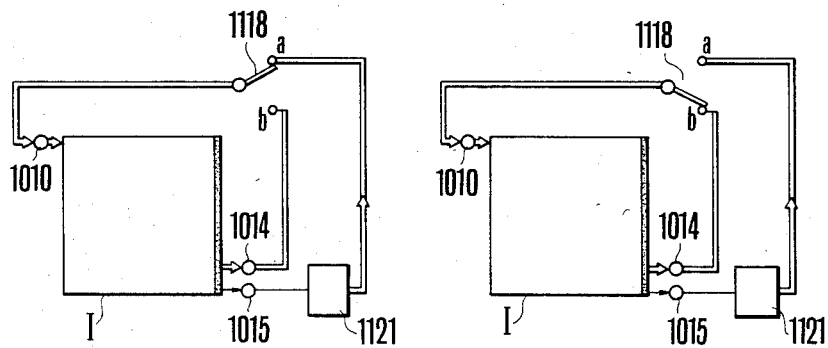
FIGS. 11(A) and 11(B) show the block diagram of a fifth embodiment of the image signal processing device for driving and controlling the solid element in FIG. 10 in a first mode.
Figure 12:
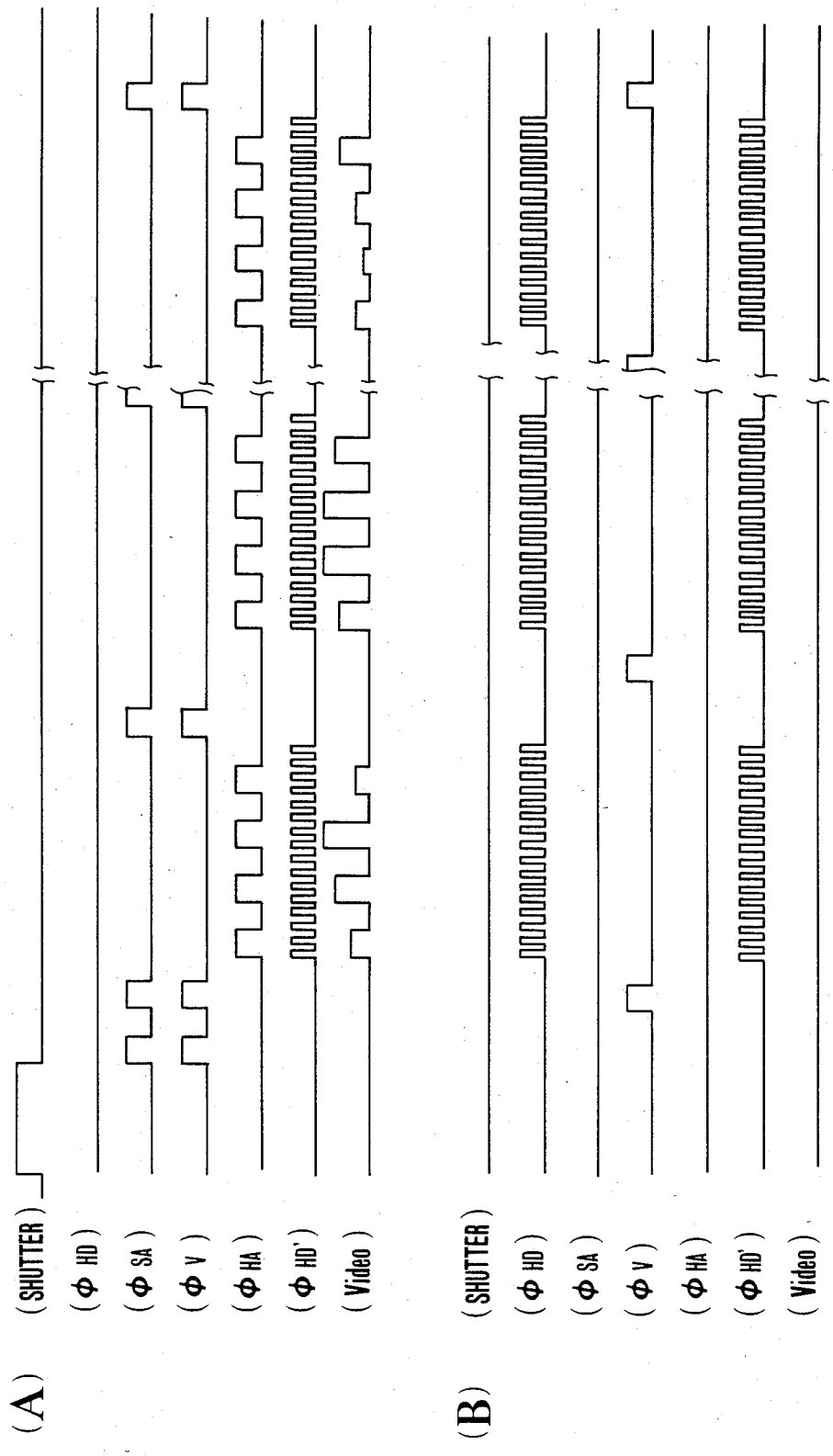
FIGS. 12(A) and 12(B) show the wave forms for explaining the operation of FIGS. 11(A) and (B).

In FIG. 11, the solid state image pick-up element I of FIG. 1 and 1121 a A/D converter convert the output of the output terminal 1015 of the register 107 into a digital value of 4 bits. A switch 1118 changes the operating mode.

First, recording of the picked up image in digital values is explained in connection with FIGS. 11(A) and 12(A).

When the shutter in front of the solid image pick-up element is opened an image is formed on the solid image pick-up element via image forming optics. Thus, each picture element stores the image charge signal corresponding to the picked-up image. Because as mentioned each picture element is divided into four sections the image charge signal on each picture element is also divided into four.

Then, the shutter is closed and two transfer pulses φSA and φV are supplied as shown in FIG. 12(A). The gates 103 and 106 are now opened, while the image charge signal stored in each line of the picture element is shifted two lines in the direction of the arrows such that the image signals stored on the picture elements [41]–[44] are transferred to the shift register 107 and that stored in the picture elements [34]–[31] to the register 104. At the time of this transfer operation, the light signal stored in each territory of each picture element is independently transferred by the divided register portion, while the light signals in the four territories of one picture element independently transferred are composed when transferred to the register 107. The above transfer operation forms the recombined signal of the image signals independently stored in four territories of the picture element, namely, the image signal on the whole picture element [41] in the first bit 71b of the register 107. The second to the fourth bits 72b–74b of the register have the image signal each picture element [42]–[44] is formed therein.

Figure 16:
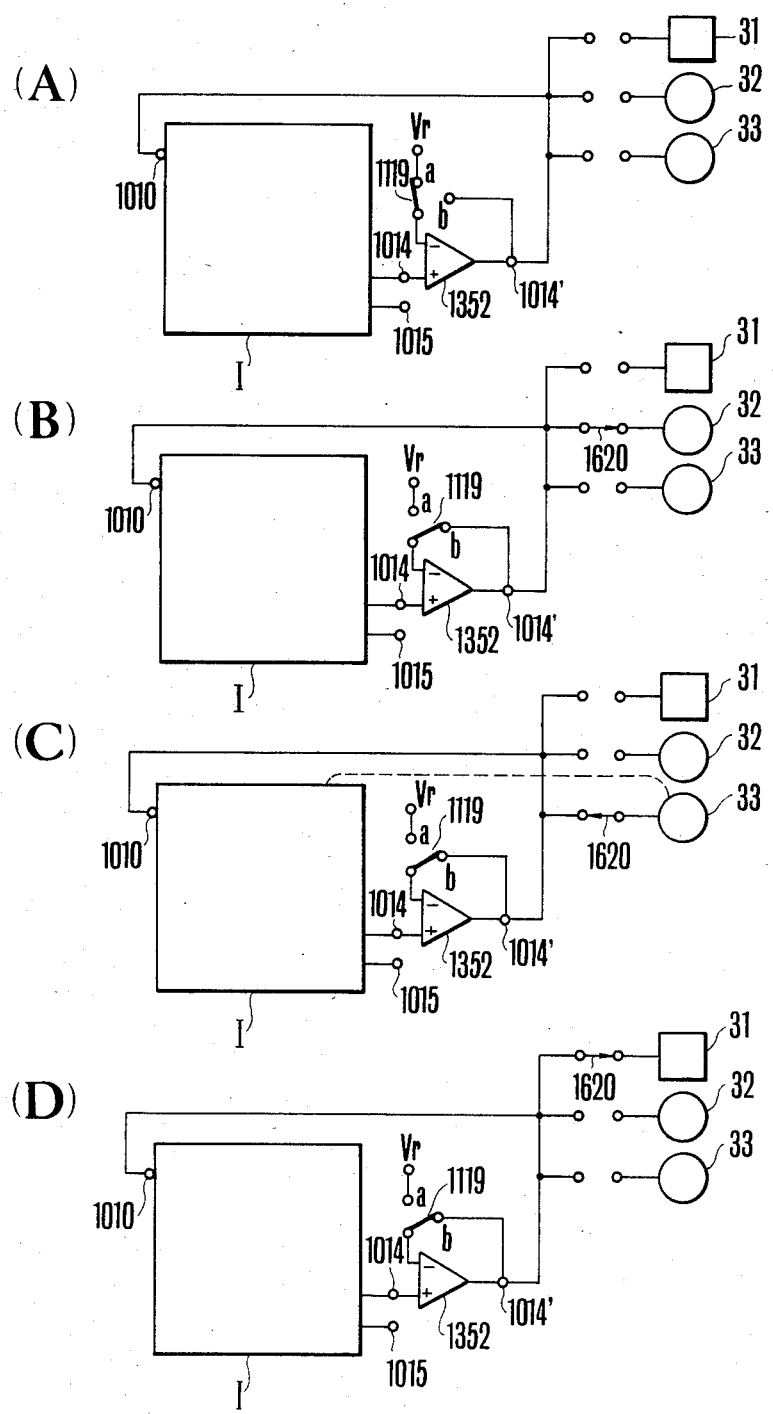
FIGS. 16(A), 16(B), 16(C) and 16(D) are block diagrams of an eighth embodiment of the image signal processing device of the present invention.

Then, as shown in FIG. 12(A) four pulses φHA serially transfer the content of the register 107 from the output terminal 1015 so as to complete the reading of the content of the register 107. An A/D converter 1121 converts the signal from the output terminal into a digital signal. The signal of each bit of the register 107 is, for example, converted into four bit information by the A/D converter. On the other hand, during the time the pulses φHA are delivered, as shown in FIG. 12(A), 16 pulses φHD′ are delivered such that as mentioned the A/D converted signal of each bit of the register 107 is applied to the input terminal 1010 via the switch 1118 and transferred to the register 108. Thus, the light signal of the first bit 71b of the register 107, namely, the light signal stored in the picture element [41] is independently transferred to the bits 1b–4b of the register 108 bit by bit as a four bit digital value. In the same way the light signal stored in the picture element [42] is transferred to the bits 5b–8b of the register 108 as a four bit digital value, that stored in the picture element [43] to the bits 9b–12b of the register 108 and that stored in the picture element [44] to the bits 13b–16b of the register 108.

Thus, when one transfer pulse φV, φSA (FIG.12(A)) is supplied after the image signal of the picture element [41]–[44] has been transferred to the register 108 as a serial digital signal of four bits, the content of the register 104 is transferred to the register 107, while the signal of the charge stored in each line is transferred downwards one line. At this time the content of the register 108, namely, the digital signal of the charge stored in the picture element [41]–[44] is transferred to the first line of the solid image pick-up element. At the transfer operation of the content of the register 108, the signal of each bit of the register 108 is independently transferred one bit with the divided register. Namely, the binary signal of the bit 1b of the register 108 is independently transferred to the transfer shift register portion 11a. In the same way, the binary signals of the bits 2b, 3b and 4b are independently transferred to the register portion 11b, 11c and 11d.

Then, in the same way mentioned, 16 pulses $\phi$HD' and 4 pulses $\phi$HA convert the content of the register 107, namely, the image signal stored in the picture element [31]-[34], into a digital value of four bits and transfer content to the register 108. Then, one pulse $\phi$SA, $\phi$V and then 16 pulses $\phi$HD' and four pulses $\phi$HA successively convert the charge stored in the picture element [21]-[24], [11]-[14] into a digital value of four bits and record the charge in each line of the solid state element.

After the image signal of each picture element is converted into a digital value and recorded in each line of the solid state element, the switch 118 is changed to the contact b as shown in FIG. 11(B). Thus, the output terminal of the register 104 is connected to the input terminal of the register 108 such that the digital signal of four bits at the output of the register 104 and corresponding to the signal of the light incident upon each picture element is applied to the register 108 and circulated in it. Thus, as shown in FIG. 12(B), alternatively supplying the transfer pulse $\phi$V (one pulse) and the pulses $\phi$HD', $\phi$HD (sixteen pulses) successively delivers the four bit signal corresponding to the signal of the charge stored in each picture element [11]-[44] from the output terminal 1014. Namely, the pulse $\phi$V, independently in parallel, transfers the four bit signal corresponding to the signal stored in each picture element downwards in the drawing in the divided register, while with the pulses $\phi$HD', $\phi$HD serially transfer the content of the register 104 to the register 108, and the output terminal 1014 successively carries the four bit serial digital signal corresponding to the charge stored in each picture element.

Thus, by connecting, for example, a TV monitor to the output terminal 1014 of the register 104, the same picture, that is, picked up is reproduced on the TV monitor.

In the first mode the signal of the light incident on each picture element is converted into a four bit digital value, the picked up image has sixteen tones, which is quite effective for the image recording for which tone is a problem. Where the image is recorded and reproduced by the solid image pick-up element in FIG. 10 in the second mode is explained in connection with FIGS. 13 and 14.

In FIGS. 13A and 13B, a comparator 1352 has an input terminal (+) 1353, connected to the output terminal 1014 of the register 104 of the solid image pick-up element I in FIG. 10. Another input terminal (-) 1351, is connected to a predetermined potential which is applied for setting the threshold level producing binary signals an an optional level.

In the second mode the picked up image is formed on the picture elements of the solid image pick-up element in the same way as in the first mode.

Figure 14:
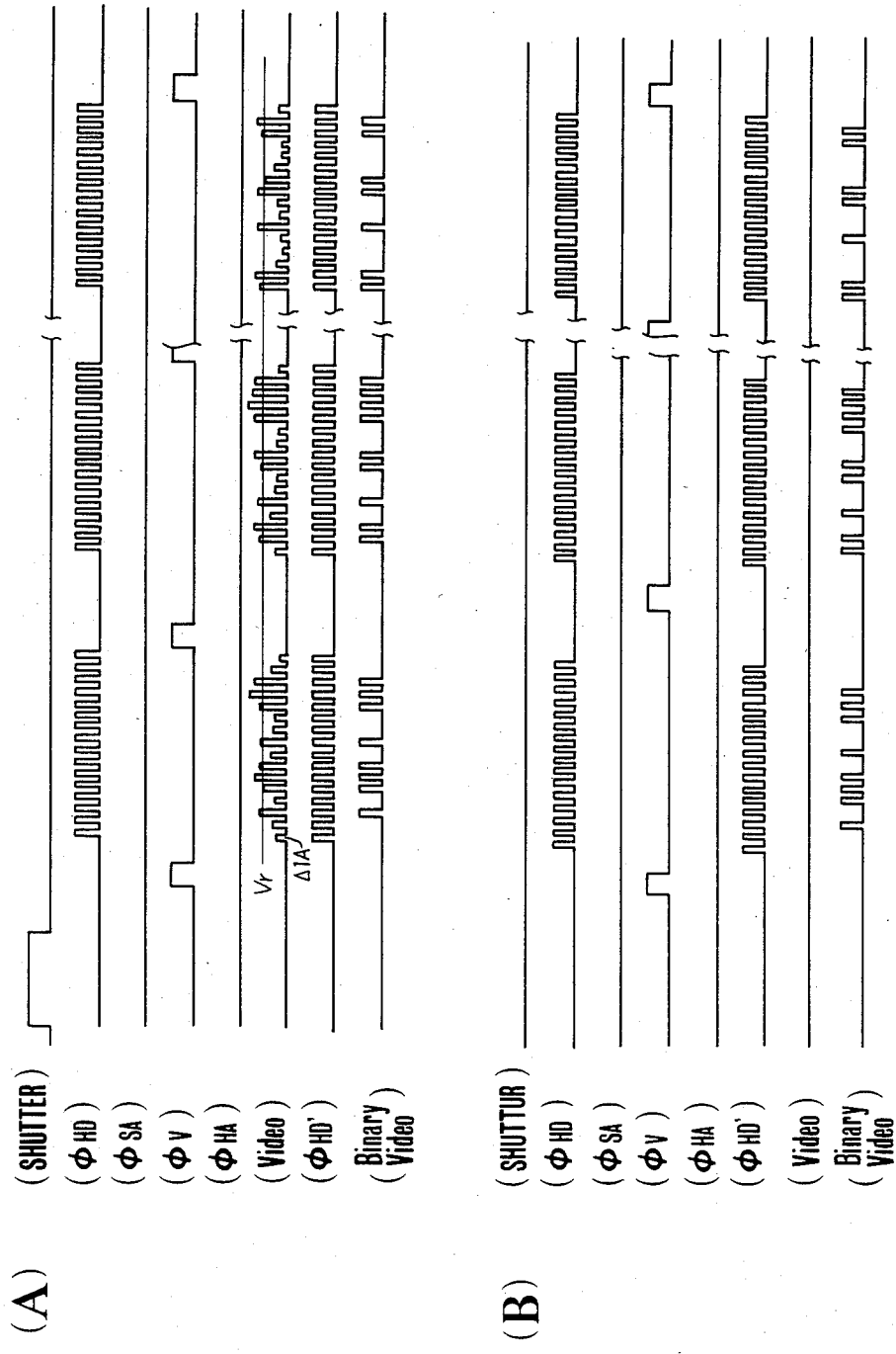
FIGS. 14(A) and 14(B) show the wave forms for explaining the operation of FIGS. 13(A) and 13(B).

The shutter is then closed as shown in FIG. 14(A) and one transfer pulse $\phi$V is supplied as shown in FIG. 14(A). Then, the signal of the light stored in the picture element [41]-[44] of the fourth line is transferred to each bit 1b -16b of the register 104. Further, the light signal of other picture element line is transferred one line along the direction of the arrow, while the content of the register 108 is transferred to the shift register portion of the picture element [11]-[14]. At the time of this transfer operation, as explained in detail in connection of the first mode, the signal of the light independently stored in the four territories (A-D) of each picture element is independently transferred to the divided register. Thus, the light signal of one territory of each picture element is transferred to each bit of the register 104. After then, sixteen pulses $\phi$HD, $\phi$HD' serially pass the content of the register 104 from the output terminal 1014 bit by bit and apply then to the input terminal (+) of the comparator 1352. Because a predetermined potential (Vr) is applied to the input terminal (-) of the comparator 1352, the light signal delivered from the register 104 bit by bit is compared with the potential and converted into a binary value. Namely, if the light signal 41A(FIG. 14) (the light signal stored in the territory A of the picture element [41] is lower than the level Vr, the light signal is converted into "0" signal. When the light signal is higher than the level Vr, the light signal is converted into "1" signal.

As explained above, the light signal stored in each territory of each picture element and transferred to each bit of the register 104 is converted into a binary value with the comparator as shown in FIG. 14(A). At this time the pulse $\phi$HD' is delivered, and the output of the comparator, namely, the binary signal, is serially transferred to each bit of the register.

After then, by alternately supplying one pulse $\phi$V and 16 pulses $\phi$HD, $\phi$HD' the light signal stored in each territory of the picture element of each line is independently converted into a binary signal, which is transferred to the divided register of the solid image pick-up element and stored therein.

After the above operation, the light signal stored in each territory of the picture element [11]-[44] is independently converted into a binary signal, which is delivered to the divided register of the solid state image pick-up element, the threshold level Vr applied to the threshold level setting terminal 1351 is removed and the terminal 1351 is connected to the output terminal 1014' of the comparator 1352. The comparator 1352 acts as the buffer in such a manner that the signal applied to the input terminal 1353 is delivered from the output terminal 1014'.

Then, as shown in FIG. 14(B), alternately supplying one pulse $\phi$V and sixteen pulses $\phi$HD, $\phi$HD' continuously delivers the light stored in each territory of each picture element and converted into a binary signal from the output terminal 1014 of the register 104 as explained in detail for the first mode. Here the signal from the output terminal 1014 is fed back to the input terminal 1010 of the solid state image pick-up element via the comparator 1352. However, because the converter 1352 acts as a buffer the binary signal is directly fed back from the output terminal 1014 to the input terminal 1010, namely, the binary signal is continuously delivered from the output terminal 1014.

Although as mentioned for the second mode the light signal has two tones, the resolving power for independently converting the light signal of each territory of each picture element into a binary value is four times as high as in the case of first mode and the image can be recorded with high resolving power for example in the case of a white and block object, so the tone is no problem.

If the output terminal 1014 of the register 104 is connected to the TV monitor, the same image that is picked up can be continuously monitored with high resolving power.

After the image is formed on the picture elements of the solid image pick-up element, when output terminal 1014' of the comparator 1352 is connected to the terminal 1351 in such as manner that the comparator 1352 acts as a buffer in advance, the light signal of each territory of each picture element is not converted into a binary value but delivered without modification. In this case, the analog signal of the picture can be obtained with a high degree of resolving power.

Although in the present embodiment the threshold level is set at Vr, the level can be set at a desired value in accordance with the signal level. By selecting the level high the light signal, of each territory of each picture element can be converted to a "0" binary value so that the transfer register of the solid state element can be refreshed. This is one of the features of the present invention.

FIG. 15 shows a block diagram of an embodiment in accordance with which the circuits for the first mode shown in FIGS. 10, 11 and 13 can be used in common with those for the second mode. In the drawing, the members having the same reference characters as those in FIGS. 11 and 13 are the same members. In the drawing 1519 represents selector switch. The operation of the present embodiment is almost the same as that of the embodiment in FIGS. 10–14, so that the detailed explanation is here omitted. In the first mode the switch 1118 is connected to the side a so as to apply the drive pulse in FIG. 12(A) and convert the image signal into a digital value, and then the switches 1118, 1119 are switched over to its terminal b so as to apply the drive pulse in FIG. 12(B). The second mode the switch 1118 is connected to terminal and the switch 1119 is connected to the terminal a to apply the drive pulse in FIG. 14(A) and convert the image signal into a binary signal. Then the switch 1119 is connected to the terminal b to apply the drive pulse in FIG. 14(B).

FIGS. 16(A) to 16(D) block diagrams of an embodiment of the image signal processing device of the present invention for forming the image, and recording and reproducing the external signal by means of the solid state element in FIGS. 10 and 13.

In FIGS. 16(A) to 16(D) an image signal output device 31 is formed an apparatus such as a TV monitor, an IJP (ink jet printer) or a telephone sending terminal. A external memory 32 records the signal on magnetic tape, a magnetic disc, a semi-conductor memory, or a photo disc, etc. A signal receiving device is in a form such as a TV tuner, a telephone receiving terminal, and so on. Other constructions are same as those in FIGS. 10 and 13, so that a detailed explanation is omitted here. Members having the same reference characters as those in FIGS. 10 and 13 are the same.

When the picked up image is stored in the solid element as a digital value, the switch 1119 is connected to the terminal a as shown in FIG. 16(A). The connections in this case are substantially the same as shown in FIG. 13(A). Applying the pulse in FIG. 14(A) converts the signal of the image of each territory of each picture element of the solid element I independently to a binary value and stores them in the solid state element. When the binary signal stored in the solid element and corresponding to the image signal is recorded in the external memory, as is shown in FIG. 16(B), the switch 1119 is connected to the contact b. As explained above the comparator 1352 now acts as a buffer. Thus, by applying the pulses $\phi V$, $\phi HD$, $\phi HD'$ to the solid element I as shown in FIG. 14(B), the binary signal circulates in the solid state element as mentioned and the output terminal 1014' of the comparator continuously delivers the binary signal corresponding to the signal of the light of each territory of each picture element of the solid state element. By selecting the image signal recording device 32 with the selection switch 1620 the above binary image signal is recorded in the recording device.

If magnetic tape and such are used in the recording device, it is necessary to adjust the drive speed of the transfer pulses in FIG. 14(B) to the speed at which magnetic tape can be recorded. That is, the speed at which the image signal can be recorded differs with the recording medium of the recording device and it is necessary to adjust the speed of which the image signal is supplied to the recording device at the above recordable speed. As mentioned in accordance with the present invention the image signal is circulated in the solid element. Hence, only by adjusting the drive speed of the drive pulses of the solid state can the speed at which the image signal is supplied to the recording device be optionally adjusted in a very simple manner. If the image signal recorded in the recording device 32 is reproduced, by means of the connection in FIG. 16(B) the recorded image signal is delivered from the recording device 32, while the solid state element is driven by the pulses in FIG. 14(B). Thus, the image signal is transferred from the recording device to the transfer register of the solid state element. At this time it is necessary to adjust the drive speed of the transfer pulse such that the driving speed of the solid state element corresponds to the reading speed of the image signal from the recording device.

After the image signal is transferred to the transfer register of the solid state element in this way, the image signal output device 31 in FIG. 16(D) is connected to the output terminal 1014' of the comparator 1352 via a switch 1620 so as to drive the solid state element with the drive pulses in FIG. 15(B). Thus, as explained the image signal is circulated with the shift register 104 in the solid element I and the image signal is continuously delivered from the output terminal 1014. Thus, when a TV monitor is used as the output device 31, the same image signal that is recorded is delivered to the monitor and the same image is continuously reproduced. Because the drive speed of the TV monitor is comparatively high it is necessary to set the drive speed of the drive pulse of the solid state element I higher than the recording speed or the reading speed of the recording device to correspond to the driving speed of the TV monitor. When using an IJP or the telephone as an output device it is sufficient if the drive frequency of the driving pulse is adjusted to drive the solid state element in accordance with the drive frequency band of each device.

The timing pulses for recording the signals from the signal receiving device in the transfer register of the solid element are shown in FIG. 16(C).

Here the receiving device 33 is selected by the switch 1620 to drive the solid state element I with the transfer pulse in FIG. 14(B). Thus, the signal from the receiving device is recorded in the shift register of the solid state element I. It is necessary to adjust the drive speed of the solid state element according to the signal receiving speed of the receiving device.

Where the signal from the receiving device is supplied with an irregular drive frequency, it is possible successively and regularly to record the received signal in the shift register of the solid element if as shown by the dotted line the transfer pulses $\phi HD$, $\phi HD'$ are supplied in synchronism with the drive frequency of the received signal. Thus, by supplying the drive pulses to the solid state element at a predetermined period as shown in FIG. 14(B) during reproduction the recorded received signal can be regularly delivered at a predetermined period from the output terminal 1014'. Consequently, it is possible to compensate for the time axis of the received signal quite easily. For example, even when a telephone signal is received at a irregular period it is possible to deliver the received signal from the solid element regularly at a predetermined period with the aforementioned operation.

As mentioned above, in the image signal processing device of the present invention, one picture element of the solid state element is divided into a number of territories and the light signal of each territory is independently transferred, while the light signal in each territory is converted into a binary value and circulated in the solid element. This makes possible solving the problem of dark current and the transfer efficiency. At the same time, a binary signal with high resolving power can be circulated in the solid state element such that the binary signal of high resolving power can be an input and output and by simply adjusting the drive pulses the band of the signal during and output operation can be converted so that it is possible easily to compensate for the time axis changes between the input signal and the output signal. Thus, the device of the present invention can be used as a processing circuit quite effectively sending and receiving a telephone signal. In this way the application as the image signal processing circuit can be significantly enlarged.

Although the solid element in the present embodiment is a CCD area sensor whose light sensing portion acts at the same time as its transfer portion part, it goes without saying that the interline type, the frame transfer type in which the light sensing part and the store part are separated and any other types of devices of this kind can be used.

Further, in the case of the present embodiment, the solid element has the picture elements in four columns and in four rows and each picture element is divided into four territories. When the picture element is in N lines and in M rows and each picture element is divided into S territories, it is sufficieht to make the number of the bits of the shift registers 108, 104 MXS and that of the bits of the shift register M.

In this case it is necessary to choose the ratio of the transfer pulse $\phi HD'$ to $\phi HA$ as S:1 in the mode in which the image is recorded in the digital value and that of $\phi HD'$ to $\phi HD$ as 1:1 in the mode in which the digitally converted image signal is circulated. By choosing the number of the divided registers for each picture element as the sum of the number of the bits when the image signal for each picture element is A/D converted with that of the bits for checking the parity it is possible to circulate the image signal converted into the digital value in the solid element, while the parity is being checked.

According to an embodiment it is effective a compact device is realized by combining the A/D converter with the solid image pick-up element into a single construction.

What I claim:

1. An image signal processing device comprising:
   (a) memory means, storing image information constituting lines and rows;
   (b) register means for storing information in two adjacent lines in the memory means; and
   (c) control means for entering information in one of the two adjacent lines of the register means into the memory means and reading the information from the other of the two adjacent lines in the register means.

2. An image signal processing device according to claim 1, wherein the memory means is arranged for image pick-up.

3. An image signal processing device according to claim 1, wherein the register means includes at least two horizontal shift registers.

4. A semi-conductor device comprising:
   (a) a memory portion for storing image information along horizontal scanning lines;
   (b) two horizontal shift registers for storing information of two adjacent horizontal scanning lines of the memory portion; and
   (c) at least one horizontal shift register for entering signals in the memory part.

5. A semi-conductor device comprising:
   (a) a memory portion for storing image information, said portion including plurality of independent electrically charged elements;
   (b) a first horizontal shift register portion being arranged for storing a sum of charges on the plurality of the elements and having storage addresses smaller in number than that of the elements; and
   (c) a second horizontal shift register portion having storage addresses in number corresponding to that of the elements so as to read the charge of each element.

6. An image signal processing device comprising:
   (a) memory means for storing image information, said memory means having signal input means and signal output means;
   (b) converting means for converting the output at the output means of the memory means into digital information;
   (c) a first signal path for entering the output of the converting means in the input means of the memory means and;
   (d) a second signal path for reading the output of said memory means without said converting means.

* * * * *